(12) United States Patent
Fukashiro

(10) Patent No.: US 8,165,467 B2
(45) Date of Patent: Apr. 24, 2012

(54) OPTICAL TRANSMISSION SYSTEM AND OPTICAL NODE

(75) Inventor: Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 714 days.

(21) Appl. No.: 12/275,661

(22) Filed: Nov. 21, 2008

(65) Prior Publication Data

US 2009/0136233 A1    May 28, 2009

(30) Foreign Application Priority Data

Nov. 22, 2007  (JP) ................................ 2007-303317

(51) Int. Cl.
H04J 14/02 (2006.01)

(52) U.S. Cl. .............. 398/83; 398/59; 398/97; 398/128; 398/135; 398/147

(58) Field of Classification Search ................. 398/1–7, 398/19, 20, 59, 67, 79, 82–85, 97, 128, 147
See application file for complete search history.

(56) References Cited

U.S. PATENT DOCUMENTS

| 6,195,186 | B1 * | 2/2001 | Asahi | 398/5 |
| 7,072,584 | B1 * | 7/2006 | Lichtman et al. | 398/59 |
| 7,650,075 | B2 * | 1/2010 | Kikuchi | 398/83 |
| 7,831,149 | B2 * | 11/2010 | Sakamoto | 398/83 |
| 2005/0129403 | A1 | 6/2005 | Koopferstock | |

FOREIGN PATENT DOCUMENTS

| JP | 11-252049 A | 9/1999 |
| JP | 2000-031969 | 1/2000 |
| JP | 2003-209864 A | 7/2003 |
| JP | 2003-224872 A | 8/2003 |
| JP | 2007-514380 A | 5/2007 |

OTHER PUBLICATIONS

Frisken "High Performance 'Drop and Continue' Functionality in a Wavelength Selective Switch" The Optical Society of America 2006.
Japanese Office Action issued in Japanese Patent Application No. 2007-303317, dated Sep. 6, 2011.

* cited by examiner

Primary Examiner — Loha Ben
(74) Attorney, Agent, or Firm — McDermott Will & Emery LLP (57) ABSTRACT

Where an integrated monitoring and controlling unit is to control an optical add-drop unit so as to cause transmit signals from the optical transceiver of a first optical node to be received by the optical transceivers of plural different optical nodes, this purpose can be achieved by an optical transmission system provided with an alarm inhibiting device that can inhibit the optical transceiver, which is a source of transmission, from issuing any unexpected alarm.

10 Claims, 9 Drawing Sheets

| | PATH TYPE | PATH NAME | START POINT | | END POINT | |
|---|---|---|---|---|---|---|
| | | | NODE | IF MOUNTING POSITION | NODE | IF MOUNTING POSITION |
| 120-1 | 1:1 | A-B-W-U-N-001-00001 | A | 1-2-1 | B | 1-3-2 |
| 120-2 | 1:N | A-B-W-M1-N-003-00002 | A | 1-2-2 | B | 1-3-3 |
| 120-3 | 1:N | A-C-W-M1-N-003-00003 | A | 1-2-2 | C | 1-2-1 |
| 120-4 | 1:N | A-D-W-M1-N-003-00004 | A | 1-2-2 | D | 1-2-5 |
| 120-5 | 1:1 | B-D-E-U-P-012-00005 | B | 1-2-4 | D | 1-3-1 |

| DIRECTION | STATE | OFFICE A | | OFFICE B | | OFFICE C | | OFFICE D | |
|---|---|---|---|---|---|---|---|---|---|
| | | D | A | D | A | D | A | D | A |
| DOWNLINK | BEFORE ADDITION | D.C. | ADD | BRIDGE | THROUGH | DROP | D.C. | D.C. | D.C. |
| | AFTER ADDITION | D.C. | DITTO | DITTO | DITTO | BRIDGE | THROUGH | DROP | D.C. |
| UPLINK | BEFORE ADDITION | A | D.C. | D | ADD | THROUGH | D | D.C. | A |
| | AFTER ADDITION | D.C. | DITTO | DROP | DITTO | DITTO | DITTO | D.C. | D.C. |
| | | | | | | THROUGH | | ADD | D.C. |

OPTICAL TRANSMISSION SYSTEM AND OPTICAL NODE

CLAIM OF PRIORITY

The present application claims priority from Japanese patent application serial no. 2007-303317, filed on Nov. 22, 2007, the content of which is hereby incorporated by reference into this application.

BACKGROUND

The present invention relates to an optical transmission system and an optical node, and more particularly to an optical transmission system and an optical node capable of receiving a transmitted signal at plural nodes. The rapid increase in data traffic, typically over the Internet, is pushing ahead the expansion of transmission capacities of communication networks. Capacity expansion is achieved by converting transmit signals into optical signals and utilizing time division multiplexing or optical wavelength division multiplexing. A transmission device whose capacity is 10 gigabits per second per channel is now available for practical use. A point-to-point wavelength division multiplexing transmission device, which is capable of transmission for a long distance of over hundreds of kilometers by wavelength-multiplexing a few channels to dozens of channels into a single optical fiber using an optical amplifier, regenerator or the like, is now also available for practical use. To meet the increase in demand for greater transmission capacity and the requirements for further economization and service diversification, a ring-shaped optical network annularly connecting communication nodes or a mesh-shaped optical network having meshed connections to increase the flexibility of route selection are under study. The optical transmission system to be used in the ring-shaped optical network is known as an Optical Add-Drop Multiplexer (OADM). The optical transmission system to be used in the mesh-shaped optical network is known as an Optical Cross-Connect (OXC). Such optical networks can be expected to help simplify the operation by the use of a network monitoring and controlling system placing node devices under remote and centralized management or to facilitate end-to-end path management from the start point to the end point of the circuit and increase the speed of path establishment by the mutual linking of the monitoring and controlling units of the node devices.

Further, the use of a configuration in which sophisticated optical transmission technology is used to pass optical signals through nodes as they are, without electrical or optical conversion, enables the whole network to be economically realized. In an optical transmission systems used in such an optical network, one-to-one bi-directional communication is usually accomplished. In OADM and OXC, optical switches are used for the selection of add-drop/through processing or route changing-over of optical signals. At present, known optical switches for such purposes include semiconductor switches and LiNO3 switches utilizing variations in refractive index caused by applying an electric field to the material, Planar Lightwave Circuit (PLC) type switches utilizing variations in refractive index caused by applying heat to the material, movable optical switches in which the position of the optical fiber or the lens is shifted by using an electromagnet, and Micro-Electro-Mechanical Systems (MEMS) type switches in which a micro-mirror fabricated by semiconductor technology utilizing electrostatic power is controlled. There is also known a Wavelength Selective Switch (WSS) which is provided with not only a switch-over function but also a wavelength division multiplexing function using MEMS or liquid crystal technology. WSS is also capable of performing a bridging function to output signals of the same wavelength to two output ports (also known as a drop-and-continue function). A WSS having the bridging function is described in S. Frisken et al. "High performance 'Drop and Continue' functionality in a Wavelength Selective Switch", OFCNFOEC2006 postdeadline PDP14. On the other hand, audiovisual content delivery is discussed as an aspect of increasingly diverse communication services. In delivering audiovisual contents, reception of optical signals transmitted from a given node by N (N>1) nodes can be more economical than audiovisual content delivery using a router. A transmission managing device and a transmission managing method for such one-to-N type communication is disclosed in JP-A No. 2000-031969. According to the invention disclosed in JP-A No. 2000-031969, each of the one-to-N type paths is managed as one of N mutually independent virtual paths. In one-to-one type communication, bi-directional communication in which signals flow in two directions is frequently used, and in that case the type of path used is a bi-directional path. In one-to-N type communication on the other hand, the direction from "1" to "N" being supposed to be the downlink and that from "N" to "1", the uplink, it is considered that there is a state of one-way communication or traffic transmitted from "1" and received by "N" in which the downlink is heavier. If one-to-N type communication can be achieved with an optical transmission system performing one-to-one type communication as stated above, an efficient network can be architected because paths of different types can be covered by a transmission system of only one type. However, this is regarded as involving the following problem. Namely, since it is possible for optical signals which would otherwise be on the uplink to disappear, an unexpected alarm would be issued. Moreover, pass management is made more complex by the mixed presence of one-to-one type paths and one-to-N type paths.

SUMMARY

The problem noted above can be addressed by an optical transmission system including plural optical nodes capable of dropping or adding optical signals and a monitoring and controlling device that monitors and controls these optical nodes, wherein each of the optical nodes is provided with an optical transceiver and an optical add-drop unit that sends out optical signal from the optical transceiver to a transmission line or guides optical signal from the transmission line to the optical transceiver; the optical add-drop unit, regarding add signals, selects optical signals from the optical transceiver of an own node thereof or optical signals from a second transmission line for optical signals to be sent out to a first transmission line, and regarding drop signals, drops signals from the first transmission line to the own node thereof and at the same time sends out the same to the second transmission line or blocks the same to the second transmission line; and an alarm inhibiting device is further provided that, regarding transmit signals from a first optical transceiver of a first optical node, inhibits any unexpected alarm from being issued by the first optical transceiver when selection is made by the optical add-drop unit of a second optical node to drop the signals to the own node thereof and to send the same out to a transmission line in a downlink direction. The problem can also be addressed by an optical node including an optical transceiver and an optical add-drop unit that sends out optical signal from the optical transceiver to a transmission line or guides optical signal from the transmission line to the optical transceiver, wherein when the optical add-drop unit, regarding drop signals, drops signals from a first transmission line to the own node thereof and sends out the same to a second transmission line, the optical add-drop unit, regarding add signals, selects optical signals from the optical transceiver of the own node thereof as optical signals to be sent out to the first transmission line and blocks receive signals from the second transmission line.

BRIEF DESCRIPTION OF THE DRAWINGS

Preferred embodiments of the present invention will now be described in conjunction with the accompanying drawings, in which.

DETAILED DESCRIPTION

Figure 1A:
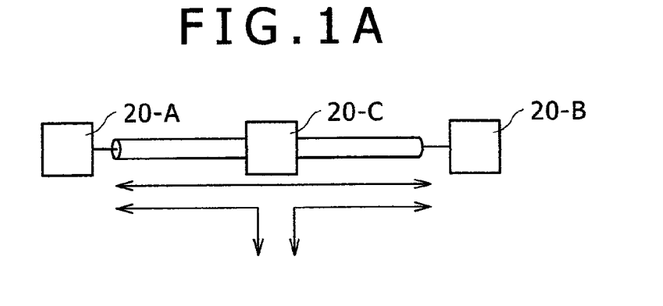
FIGS. 1A to 1C are block diagrams illustrating network forms.
Figure 1B:
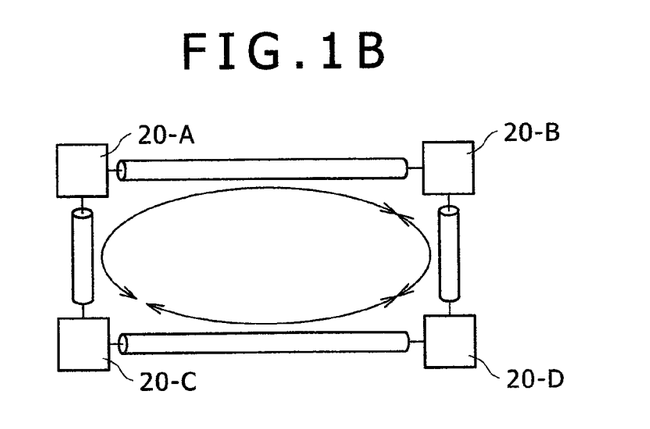
Figure 1C:
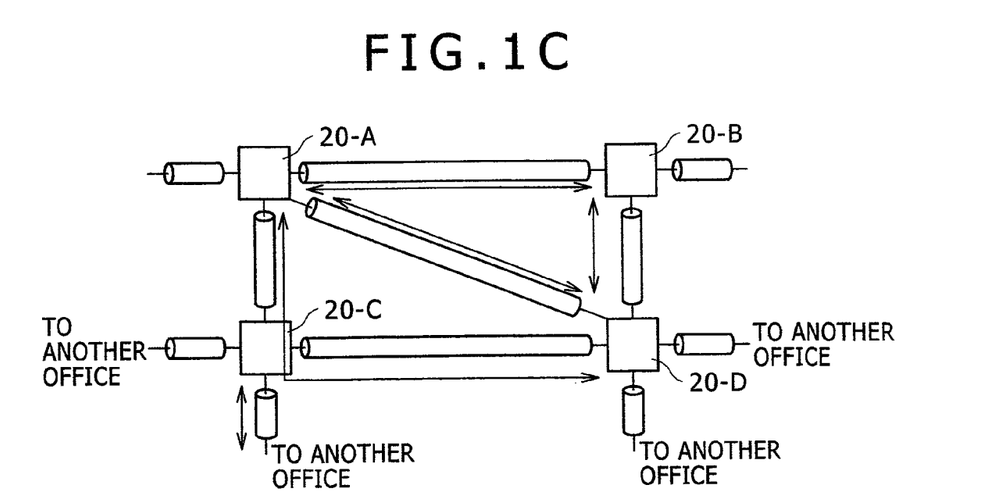
Figure 2:
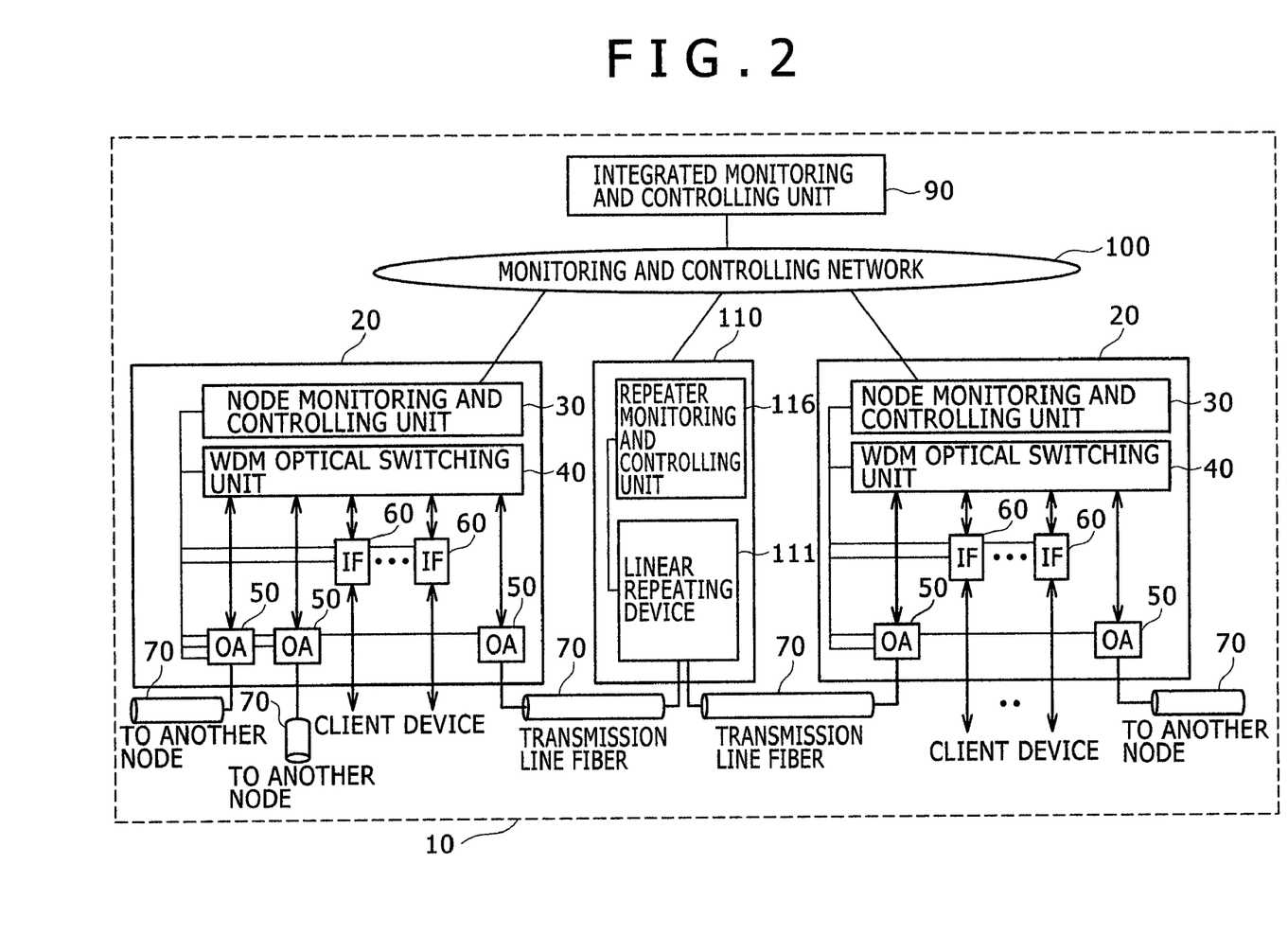
FIG. 2 is a block diagram of an optical transmission system.
Figure 3:
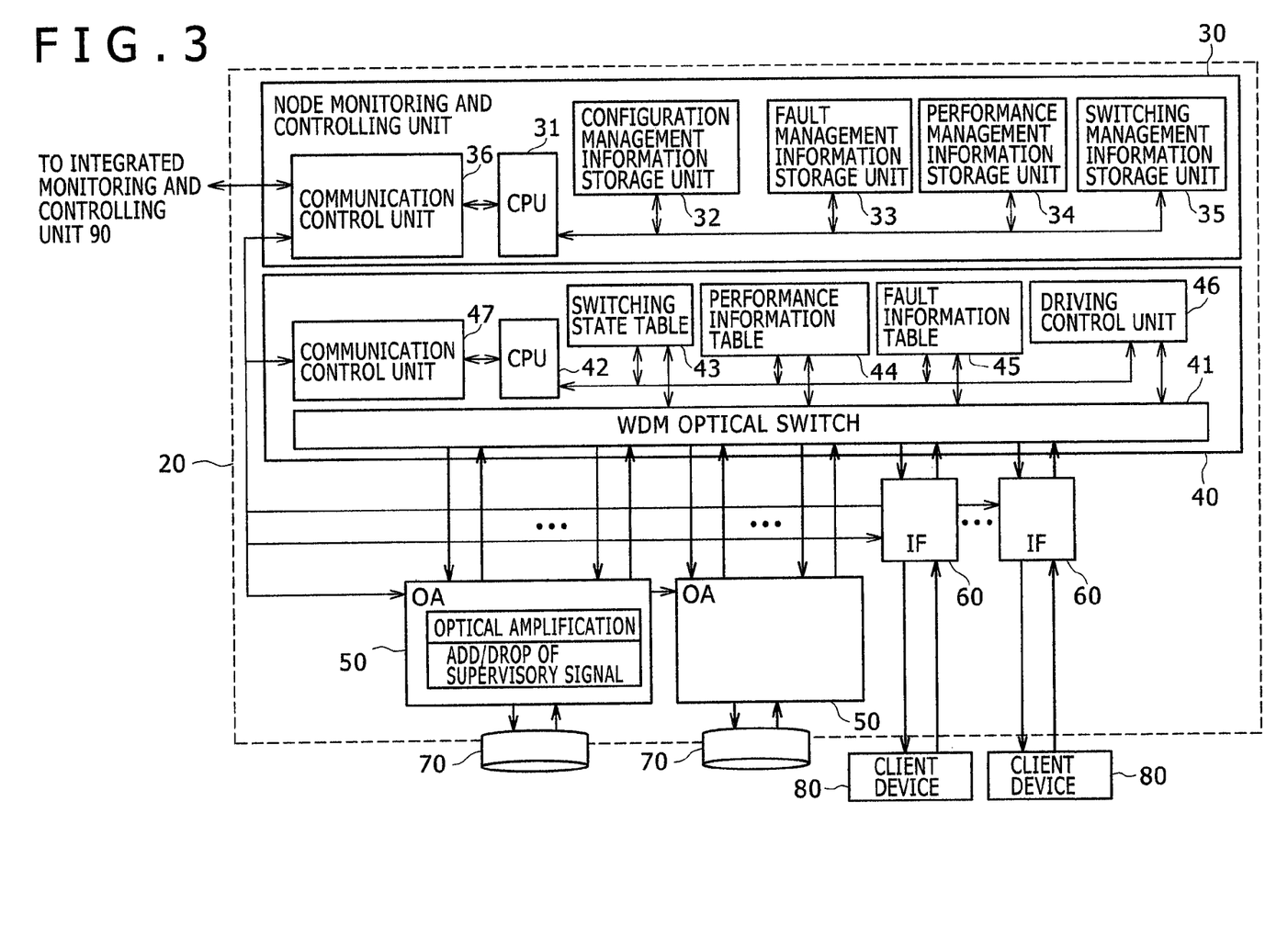
FIG. 3 is a block diagram of an optical node.
Figure 4A:
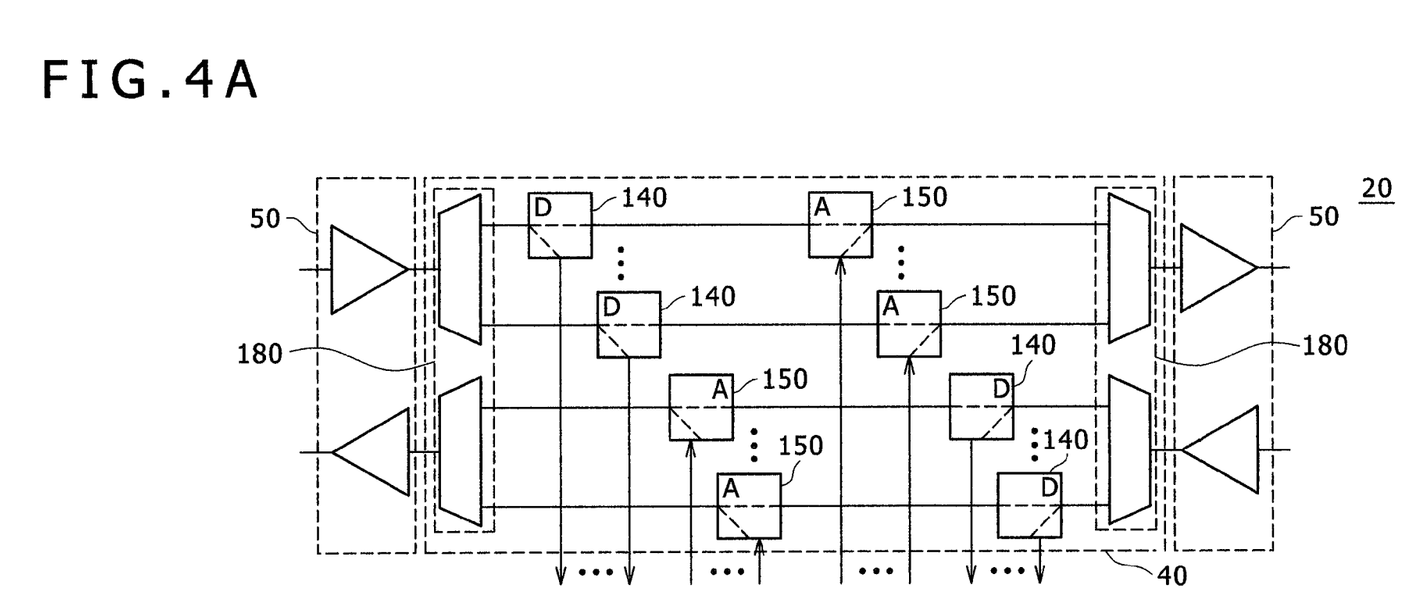
FIGS. 4A and 4B are block diagrams illustrating possible configurations of a WDM optical switch.
Figure 4B:
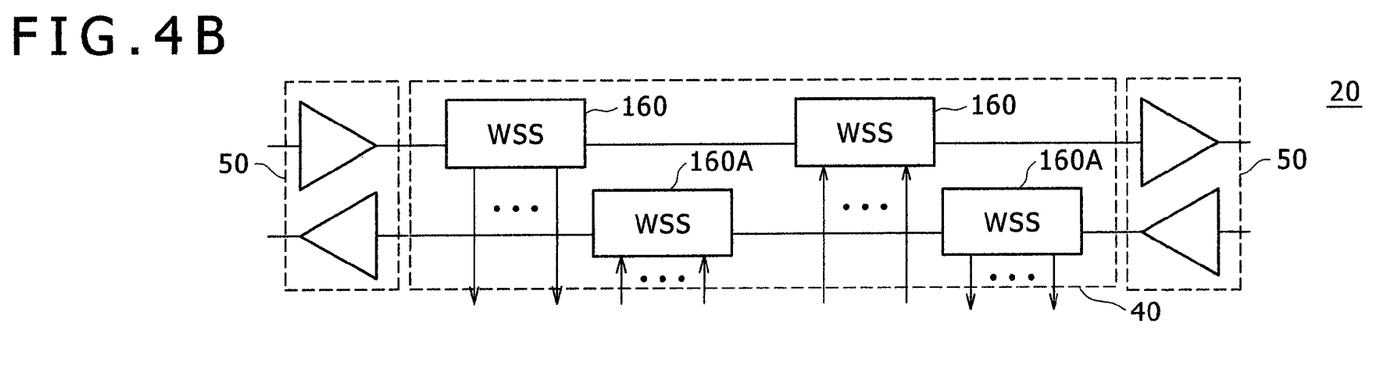
Figure 5A:
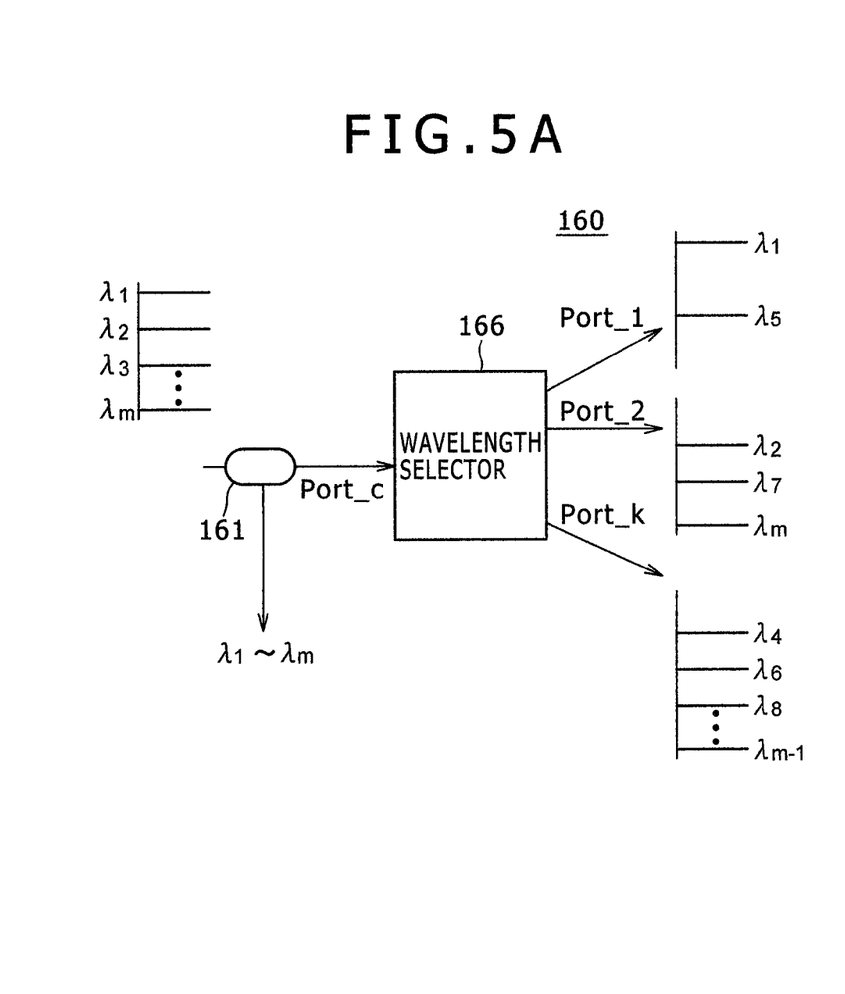
FIGS. 5A and 5B are block diagrams illustrating the configuration of a wavelength selective switch.
Figure 5B:
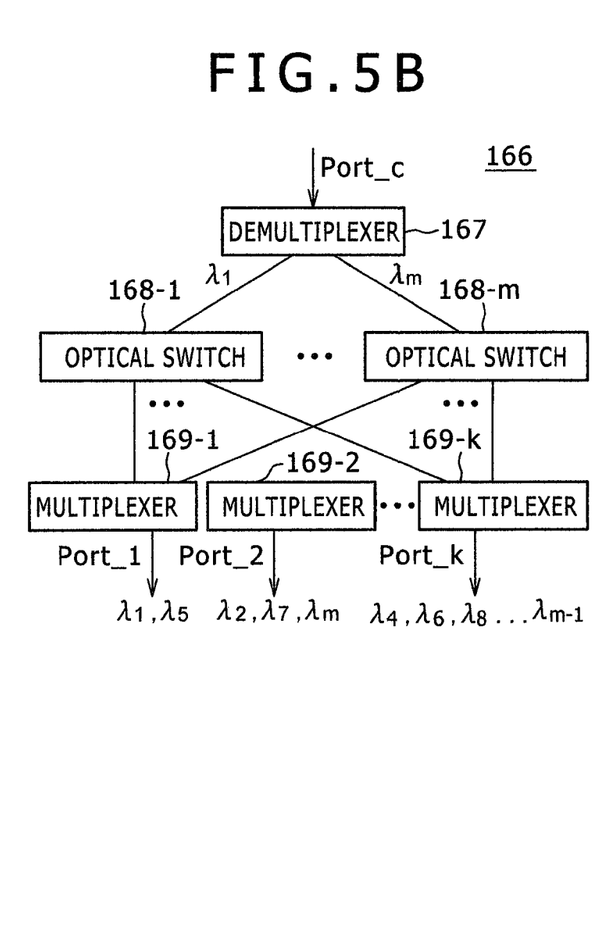
Figure 6:
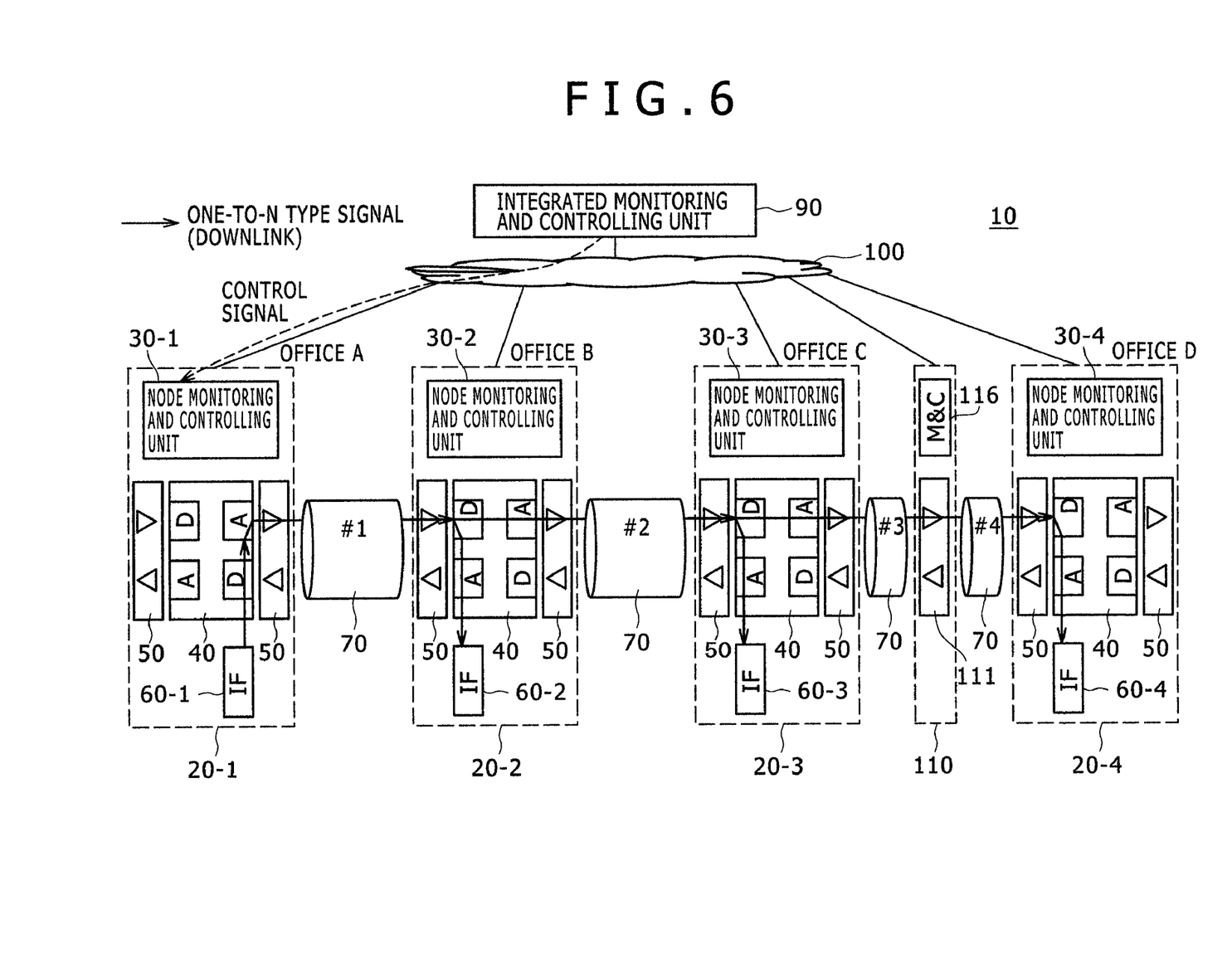
FIG. 6 is a block diagram illustrating the flows of main signals and the states of dropping and addition in an optical transmission system.
Figure 7:
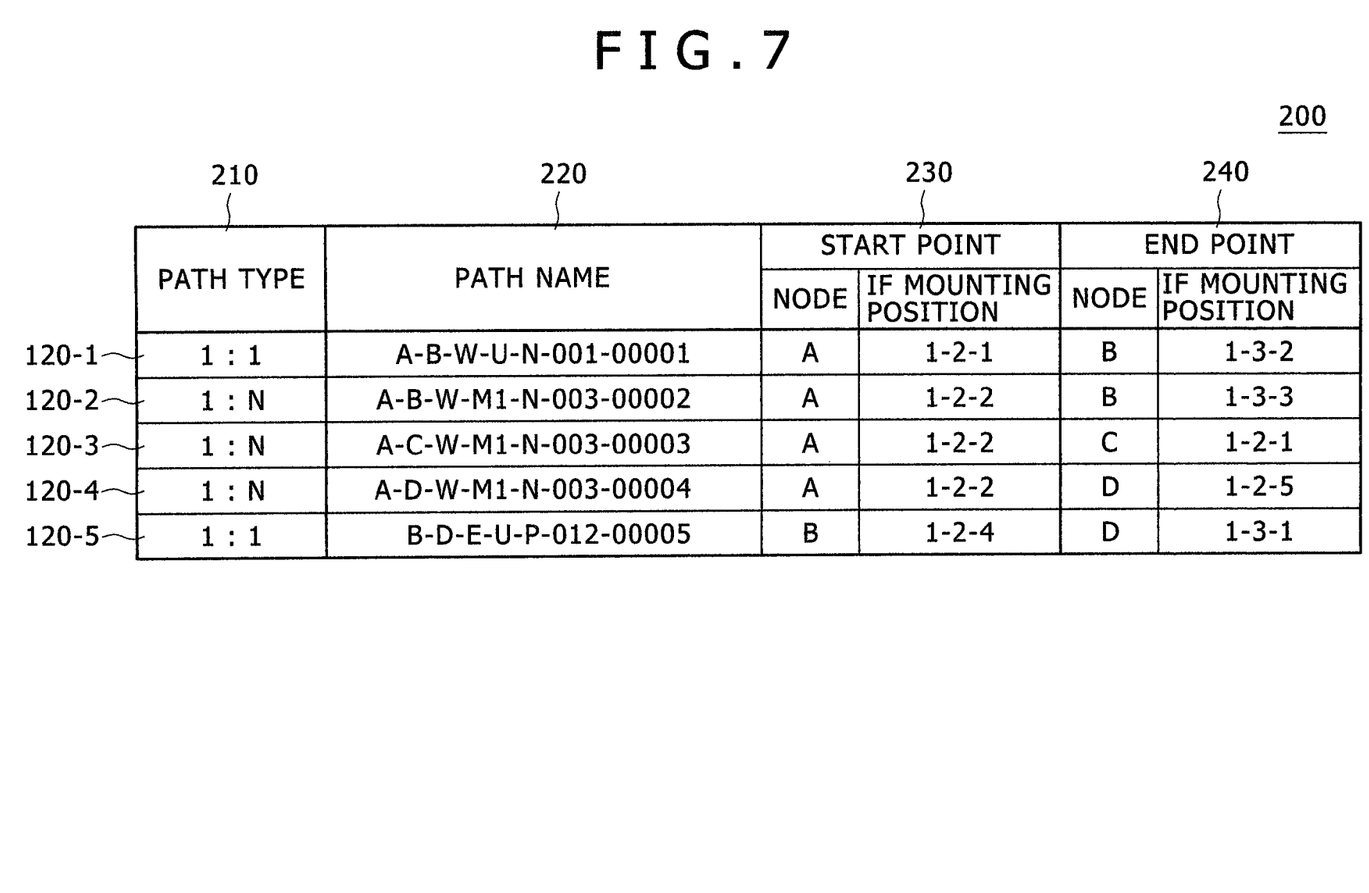
FIG. 7 illustrates a screen displaying a list of paths.
Figure 8:
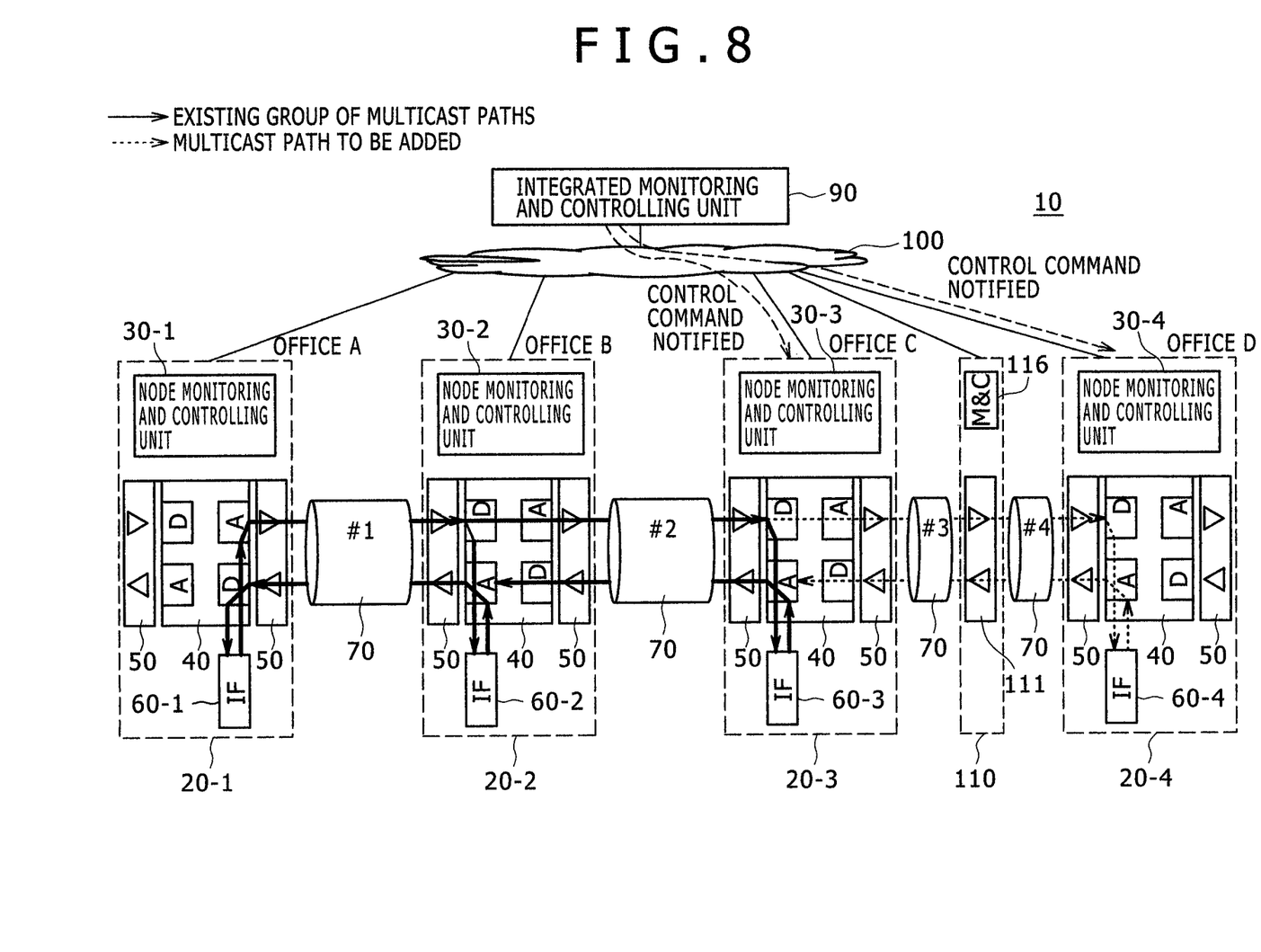
FIG. 8 illustrates the control of dropping and addition when a receiving node is to be added to the optical transmission system.

Modes of implementing the present invention will be described below with reference to preferred embodiments thereof in conjunction with the accompanying drawings. Herein, FIGS. 1A to 1C are block diagrams illustrating network forms; FIG. 2 is a block diagram of an optical transmission system; FIG. 3 is a block diagram of an optical node; FIGS. 4A and 4B are block diagrams illustrating possible configurations of a WDM optical switch; FIGS. 5A and 5B are block diagrams illustrating the configuration of a wavelength selective switch; FIG. 6 is a block diagram illustrating the flows of main signals and the states of dropping and addition in an optical transmission system; FIG. 7 illustrates a screen displaying a list of paths; FIG. 8 illustrates the control of dropping and addition when a receiving node is to be added to the optical transmission system; and FIG. 9 lists the states of drop function parts and of add function parts in the WDM optical switches.

Embodiment 1

Network forms will be described with reference to FIGS. 1A to 1C. FIG. 1A shows a configuration having two offices 20-A and 20-B at the terminal points and office 20-C between office 20-A and office 20-B, which are connected to one another by transmission line fibers. It is a linear-shaped network in which at least part of signals added at office 20-A or office 20-B can be dropped at office 20-C and other signals can be added at office 20-C. Solid lines here indicate that paths are set between office 20-A and office 20-B, between office 20-A and office 20-C, and between office 20-C and office 20-B.

FIG. 1B shows a ring-shaped network. In the ring-shaped network, office 20-A, office 20-B, office 20-C and office 20-D are connected to the respectively adjoining offices 20 by transmission line fibers. As the network constitutes a ring, even if a fiber runs into fault in one position, the network can be protected by transmission in the reverse way. Moreover, the network can be operated with relative ease. Solid lines here indicate that paths are set among office 20-B, office 20-A and office 20-C, between office 20-C and office 20-D, and between office 20-B and office 20-D. A mesh-shaped network shown in FIG. 1C is a network in which office 20-A, office 20-B, office 20-C, office 20-D and other offices 20 not shown are connected by transmission line fibers in a mesh shape. Solid lines here indicate that paths are set between office 20-A and office 20-B, between office 20-A and office 20-D, among office 20-A, office 20-C and office 20-D, and between office 20-B and office 20-D. A mesh-shaped network, though more difficult to operate and manage than a ring-shaped one, is more flexible in many respects, such as permitting rerouting of paths or load balancing according to conditions. Next, the configuration of an optical transmission system will be described with reference to FIG. 2. An optical transmission system 10 includes optical nodes 20, transmission line fibers 70 connecting the optical nodes, an integrated monitoring and controlling unit 90, a monitoring and controlling network 100 for delivering and receiving monitoring and controlling signals between the integrated monitoring and controlling unit 90 and the optical nodes 20, and a repeater 110 disposed between the transmission line fibers 70. The integrated monitoring and controlling unit 90 performs configuration management, fault management, bandwidth management, performance management, security management and so forth of the network. The integrated monitoring and controlling unit 90, in order to secure a communication bandwidth sufficient for meeting the demand between any combination of optical nodes 20, references configuration management information and fault management information to select resources available to the pertinent optical nodes 20 and a fault-free path, and sets a communication channel or path by controlling plural optical nodes including the pertinent optical nodes.

Between the optical nodes 20, the repeater 110 which performs linear repeating to extend the transmission distance is disposed. The repeater 110 includes a linear repeating device 111 which amplifies optical signals from another transmission line fiber and transmits them to still another transmission line fiber and a repeater monitoring and controlling unit 116 for monitoring the linear repeating device 111. For the repeater 110, an item having appropriate functions and performance features for maintaining a prescribed main signal quality standard according to the transmission distance, the fiber type and the position of office building is selected. The main signal quality standard is so set as to keep the bit error rate at no more than $10^{\wedge}\text{-}12$ ($10^{-12}$). Plural repeaters 110 may be disposed between the optical nodes 20. The linear repeating device 111 collectively amplifies wavelength multiplexed signals with an optical fiber amplifier using Erbium-doped fibers or the like, and monitors the optical power and wavelength. A regenerator may be applied in place of the linear repeating device 111. The regenerator once converts optical signals having traveled over the transmission line into electric signals, and performs waveform reshaping, retiming, regenerating and digital quality monitoring, including in specific terms bit error monitoring by a method known as Bit Interleaved Parity (BIP). Each of the optical nodes 20 includes plural interfaces (IFs) 60 connected to client devices, optical amplifiers (OAs) 50 connected to the transmission line fibers 70, a WDM optical switching unit 40 connected to the IFs 60 and the OAs 50, and a node monitoring and controlling unit 30 which monitors the constituent elements 40 through 60 and is connected to the integrated monitoring and controlling unit 90 via the monitoring and controlling network 100. Further details of the optical nodes 20 will be described with reference to FIG. 3.

The integrated monitoring and controlling unit 90 may use a centralized control system by a single server or redundant servers. Alternatively, a distributed control system in which device monitoring and controlling units communicate with each other to exchange network status information or route calculation, or a combination of these systems may be used as well. Where a distributed control system is used, the integrated monitoring and controlling unit may be either dispensed with or simplified. Available inter-device communication control techniques for distributed control systems include a group of protocols of Generalized Multi Protocol Label Switching (GMPLS) prescribed by RFC3471-3473 and so forth of The Internet Engineering Task Force (IETF). The optical amplifiers may be optical semiconductor amplifiers instead of optical fiber amplifiers. The repeater 110 may be an optical 2R or optical 3R repeater which has effects to reshape the waveform and to improve the signal-to-noise ratio by utilizing the nonlinear effects and the like in fibers or semiconductors without having to convert optical signals into electric signals as long as it has a function to extend the transmission distance. The repeater may have a configuration in which only the desired line out of plural lines is dropped or added by using an optical multiplexer/demultiplexer filter or an optical switch. A device which accomplishes this dropping/adding without converting optical signals into electric signals is known as an OADM. Next, the configuration of the optical node will be described with reference to FIG. 3. Each of the optical nodes 20 includes the node monitoring and controlling unit 30, the WDM optical switching unit 40 which changes over between wavelength division multiplexing and demultiplexing and the main signals, the interfaces (IFs) 60 which perform overhead processing, main signal quality monitoring using the BIP, accommodate signals from a client device 80 and convert them into the wavelength outputted to the transmission line, and the optical amplifier (OA) 50 which, with respect to signals from plural IFs 60, amplifies signals wavelength-multiplexed via the WDM optical switch as optical signals and delivers them to transmission line fibers. The IFs 60 may process error correction as set forth in the ITU-T Recommendation G. 709 to compensate for quality deterioration resulting from such factors as an extension of the transmission distance, seasonal fluctuations of fibers, loss fluctuations due to any external physical force and deterioration of parts over time. The IFs 60 accommodate signals from the client device 80 which are interfaced by STM-16 (2.5 Gbit/s), STM-64 (10 Gbit/s) and STM-256 (40 Gbit/s). The IFs 60 convert them into signals of OTU-1 (2.7 Gbit/s), OTU-2 (10.7 Gbit/s) and OTU-3 (42.8 Gbit/s) each prescribed by ITU-T G.709 OTN and having a wavelength prescribed by ITU-T, and outputs the converted signals to the WDM optical switching unit 40. The IFs 60 also convert signals from the WDM optical switching unit 40 in the reverse way to the foregoing. The IFs 60 may further have a function to regenerate and repeat signals transferred from one transmission line to another transmission line into signals of OTU-n (n=1, 2, 3).

As client signals, GbE (1 Gbit/s) prescribed by IEEE 802.3z and 10GbE (10.3 Gbit/s) prescribed by IEEE 802.3ae are also accommodated. The speed of interfacing with the WDM optical switching unit 40 involves the addition of the proportion of error correcting codes, about 7% to 25%, to the speed of the applicable one of these signals. The WDM optical switching unit 40 selects the output destination routes of signals from the IFs and performs wavelength division multiplexing. The WDM optical switching unit 40 includes a WDM optical switch 41, a CPU 42, a switching state table 43, a performance information table 44, a fault information table 45 and a driving control unit 46, all connected to the CPU 42 by internal communication lines, and a communication control unit 47 connected to the CPU 42 and to the node monitoring and controlling unit 30. The node monitoring and controlling unit 30 includes a CPU 31, a configuration management information storage unit 32, a fault management information storage unit 33, a performance management information storage unit 34 and a switching management information storage unit 35, all connected to the CPU 31 by internal communication lines, and a communication control unit 36 connected to the CPU 31, the integrated monitoring and controlling unit 90, the WDM optical switching unit 40, the IFs 60 and the OAs 50. The OA 50 amplifies signals from the WDM optical switching unit 40 and delivers the amplified signals to the transmission line fiber 70. The OA 50 also amplifies wavelength-multiplexed signals from the transmission line fiber 70 and delivers the amplified signals to the WDM optical switching unit 40. Further, the OA 50 multiplexes/demultiplexes signals for monitoring and control. The optical power of delivery to the transmission line fiber is determined with account taken of the number of wavelengths, losses on transmission lines between optical nodes, the Optical Signal-to-Noise Ratio (OSNR) due to the noise figure of the optical amplifier, and the waveform deterioration or noise increase due to nonlinear effects, chromatic dispersion or polarization mode dispersion in the fibers. Known nonlinear effects include Self Phase Modulation (SPM), Cross Phase Modulation (XPM) and Four Wave Mixing (FWM). The extent of waveform deterioration is dependent on the number of wavelengths, the dispersion of fibers, a nonlinear constant, input power to the fibers and losses on optical fibers and so forth. The dispersion of fibers and nonlinear constant differs whether the fibers are single mode fibers (SMF) or dispersion-shifted fibers (DSF). Even DSFs of the same kind may differ from one product to another. The output power of the amplifier before delivering signals to the IF 60 is determined with account taken of the loss of the WDM optical switching unit 40, OSNR at the ends of the path, and the dynamic range of the receiver and receiver sensitivity. A dispensation compensation function to cancel waveform distortion by wavelength dispersion may be built into the OA 50 or the IF 60. Commercially available means for realizing dispensation compensation function include a dispensation compensation fiber different in sign from the transmission line fibers, fiber diffraction grating, optical lens, resonator and what uses electric signal processing. As the wavelengths to be outputted from the IFs 60, wavelengths on the wavelength grid prescribed by the ITU-T Recommendations G694.1 and G694.2 can be used. By setting appropriate transmitting conditions, the number of wavelengths can be selected from a wide variety including 8, 16, 20, 40, 64, 80, 128 and 160. Next, the configuration of the WDM optical switch will be described with reference to FIGS. 4A and 4B. The optical node 20 includes the WDM optical switching unit 40 and the OAs 50. As the description here concerns the WDM optical switching unit, the IFs and other constituent elements whose description is dispensable will not be touched upon.

A number of ways are conceivable for the configuration of the WDM optical switching unit 40. As shown in FIG. 4A, it may include a multiplexer/demultiplexer 180, a drop function unit 140 and an add function unit 150. Or wavelength selective switches 160 and 160A may be applied as shown in FIG. 4B.

The multiplexer/demultiplexer 180 in FIG. 4A uses a PLC type element known as Arrayed Waveguide Grating (AWG). The drop function unit 140 uses an optical splitter. The add function unit 150 uses a 1×2 optical switch. The choice is not limited to the foregoing. The 1×2 optical switch may be what is formed by integrating plural channels. Next, the wavelength selective switch will be described with reference to FIGS. 5A and 5B. In FIG. 5A, a wavelength selective switch 160 includes a splitter 161 and a wavelength selector 166. The splitter 161 splits each of input wavelength-multiplexed signals of $\lambda 1$ to $\lambda m$ into two wavelength-multiplexed signals of $\lambda 1$ to $\lambda m$ and outputs the split signals through two ports. The wavelength selector 166, by receiving inputting of m wavelength-multiplexed signals of $\lambda 1$, $\lambda 2$, $\lambda 3$, . . . , $\lambda m$ through Port_c and inputting a prescribed control signal, outputs one or plural desired wavelengths through any desired output port. The wavelength selector 166 is shown here in a case in which $\lambda 1$ and $\lambda 5$ are outputted through Port_1, $\lambda 2$, $\lambda 7$ and $\lambda m$ through Port_2 and $\lambda 4$, $\lambda 6$, $\lambda 8$, . . . , $\lambda m$-1 through Port_k. It is also possible here to effect such control as let no wavelength be outputted through a certain port. Further, control is so effected as to block $\lambda 3$ from being outputted through any output port. It is also permissible to call the wavelength selector the wavelength selective switch. FIG. 5B shows functional blocks of the wavelength selector. When a wavelength-multiplexed signal is inputted to the wavelength selector 166 through Port_c, it is demultiplexed by a demultiplexer 167 into the constituent wavelengths, and these wavelengths are inputted to optical switches 168, one of which is made available for each wavelength. The lights differing in wavelengths inputted to the optical switches 168 are inputted to multiplexers 169, one of which is made available for each output port, in response to a control signal. The multiplexers 169 wavelength-multiplex the lights differing in wavelength inputted from the optical switches, and output the multiplexed signals. It is possible in this way to input wavelength-multiplexed signals and take out from any desired output port lights of any desired number and wavelength. It is possible to realize a bridge in the drop function unit with a WSS described in S. Frisken et al. "High performance 'Drop and Continue' functionality in a Wavelength Selective Switch", OFCN-FOEC2006 postdeadline PDP14 or a WSS of the configuration described here and apply it to one-to-N type optical paths. Whereas the drop function unit was described with reference to FIGS. 5A and 5B, it is obvious to persons skilled in the art that, if the multiplexers 169 are caused to operate as demultiplexers and the demultiplexers 167, as multiplexers, it will operate as the wavelength selective switch 160A shown in FIG. 4B.

Next, the flow of main signals and the state of dropping/addition in the optical transmission system will be described with reference to FIG. 6. The optical transmission system 10 includes the integrated monitoring and controlling unit 90, the monitoring and controlling network 100, an optical node office A 20-1, an optical node office B 20-2, an optical node office C 20-3, an optical node office D 20-4, the repeater 110 and the transmission line fibers 70. Each of the optical nodes 20 includes the node monitoring and controlling unit 30, the OAs 50, the WDM optical switching unit 40 and the IF 60.

In the case described below, a one-to-N type optical path is set from office A to offices B, C and D. On a usual one-to-one type optical path, as bi-directional communication takes place, there also are optical signals in the direction from office D to office A (hereinafter also expressed as "uplink") together with optical signals in the direction from office A to office D (hereinafter also expressed as "downlink"). However, on a one-to-N type path, sometimes there may be only signals in the downlink direction, there can be an absence of receive signals at the IF 60-1 of office A. On a usual one-to-one type optical path, the IF 60-1 detects the absence of receive signals as an alarm, and notifies the fact to the integrated monitoring and controlling unit 90 via the node monitoring and controlling unit 30-1. In the optical transmission system 10 of this embodiment in which one-to-one type optical paths and one-to-N type optical paths are used in mixture, IFs 60 of the same kind are used in common by the one-to-one type optical paths and the one-to-N type optical paths. Where IFs 60 are shared, in one-to-N type optical path setting, the IF 60-1 tries to issue an alarm because of the absence of receive signals. However, the integrated monitoring and controlling unit 90 issues a control signal to inhibit alarming by the receiver on the transmission line side of the IF 60-1 for use on the pertinent one-to-N type optical path of office A in setting the one-to-N type optical path. This enables, even after the setting of the one-to-N type optical path, any unexpected alarm from the IF 60-1 to be inhibited and unnecessary confusion of maintenance and operation to be prevented. Although the signal to inhibit alarming is supposed to be issued at the time of setting the one-to-N type optical path in the foregoing description, other methods are also available. Thus, when no optical path is set, alarming is inhibited and, when any one-to-one type optical path is to be set, the alarming inhibition is lifted. On the other hand, when any one-to-N type optical path is to be set, the alarm inhibition is maintained only for the receiver on the transmission line side of the IF 60-1. A screen displaying a list of paths will now be described with reference to FIG. 7. FIG. 7 shows a screen displaying a list of paths, which constitutes a user interface of the integrated monitoring and controlling unit 90. A path listing screen 200 shows items including a path type 210, a path name 220, and the respective node names and IF mounting positions of the start point 230 and the end point 240 of each optical path. In this illustration, the items of one-to-one type optical paths 120-1 and 120-5 are displayed. Also, one-to-N type optical paths are displayed to which related path names 220 are assigned, each individually displayed with respect to the receiving node. Three path names are assigned to one-to-N type optical paths 120-2 through 120-4 each having three receiving nodes. The path name of each include signs of the start point node, end point node, route direction, optical path type such as one-to-one or one-to-N, presence or absence of redundancy, wavelength number and serial number. Regarding the optical path type, one-to-N type optical paths having the same transmitting node can be related to one another as a one-to-N type optical path group and managed collectively by assigning the same sign and number. More specifically, in the path name "A-B-W-M1-N-003-00002" of the one-to-N type optical path 120-2, "A" represents the start point node; "B", the end point node; "W", from West to East; "M1" the first group of one-to-N type paths; "N", no redundancy; "003", the wavelength number; and "00002", the serial number. Similarly, in the path name "B-A-E-U-P-012-00005" of the one-to-one type optical path 120-5, "E" represents from East to West; "U", the one-to-one type path; and "P", 1+1 redundancy. In this embodiment, one-to-N type optical paths are assigned different but related names, and placed under individual management for each receiving node. As a result, stopping of an individual one out of the plural receiving nodes or the addition of a new receiving node is facilitated by referring group number of one-to-N type paths and so forth. Also, collective deletion of a set of one-to-N type optical paths having the same transmitting node or the same group number is facilitated. Further, when searching for or filtering one-to-N type optical paths having the same transmitting node or the same group number or related alarms or performance information, the efficiency can be enhanced, and spotting any fault or confirmation of the affected range can be facilitated.

Embodiment 2

Figure 9:
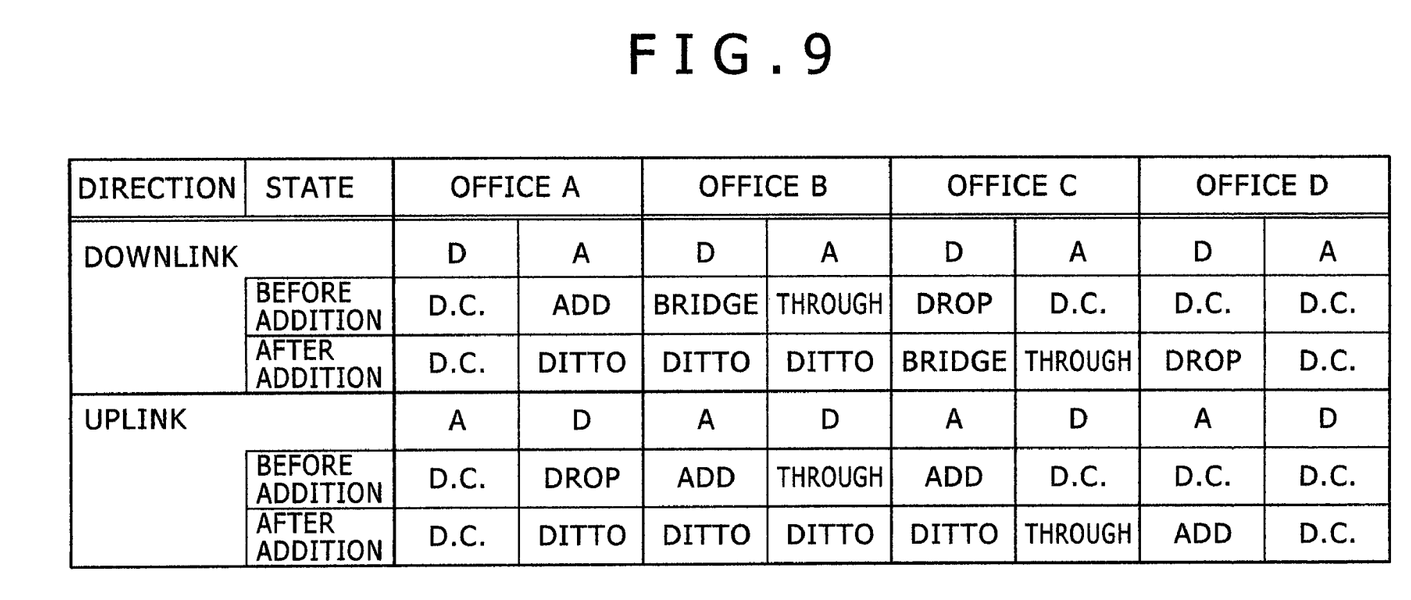
FIG. 9 lists the states of drop function parts and of add function parts in the WDM optical switches.

Control of dropping and addition when a receiving node is to be added to the optical transmission system will be described with reference to FIG. 8 and FIG. 9. In FIG. 8, it is supposed that a one-to-N type optical path having office A as the transmitting node and offices B and C as the receiving nodes is set in the optical transmission system 10. The flow of signals in this state is represented by thick solid lines. The states of the drop function unit 140 and the add function unit 150 in the WDM optical switching unit 40 are stated in the "Before addition" line in FIG. 9. In FIG. 9, the drop function unit is expressed as "D" and the add function unit, as "A". In the list, "D.C." means irrelevant and "DITTO", the same as above. As the add function unit, a 2×1 optical switch or WSS can be used, and this unit is functionally a selector. Referring back to FIG. 8, addition of office D as a receiving node to the one-to-N type optical path of the optical transmission system 10 will be described. The multicast path to be added is represented by a thick broken line. The states of the drop function unit 140 and the add function unit 150 of the WDM optical switching unit 40 then are stated in the "After addition" line in FIG. 9. Thus, the downlink drop function unit of office D is placed in the drop state, and the uplink add function unit of office D, in the add state. The downlink drop function unit of office C is placed in a bridge state, in which the bridge state may be confirmed by an optical splitter 160 before addition, the downlink add function unit, in a through state, and the uplink drop function unit, in a through state. In this way, it is made possible to add office D as a receiving node without affecting the signals received by existing offices B and C.

Another way to inhibit alarming will be described with further reference to FIG. 8. When a one-to-N type optical path is set from office A to offices B and C, control is effected not only on the drop function unit/add function unit in the downlink direction but also to have transmission signals on the dummy transmission line side to be transmitted from the IF 60-2 of office B and the IF 60-3 of office C as shown in FIG. 8. It also controls the drop function unit/add function unit of office B and office C in the uplink direction. The numbers of wavelengths that pass the uplink/downlink optical amplifiers can be thereby kept equal. As a result, any unexpected alarm related to the number of waveforms, such as inconsistency in the number of wavelengths to detect any difference between the registered number of wavelengths and the number of wavelengths in actual use, can be inhibited. When information on the number of wavelengths is to be notified to each node via the supervisory signal, the numbers of wavelengths are the same between uplink and downlink at normal states. Namely, when it is to make distinction between normal and abnormal states regarding the number of wavelengths, the same handling is made possible as between one-to-one type optical paths and one-to-N type optical paths.

Although the foregoing description included a part which might give an impression that the drop function unit would be bridged in setting the one-to-N type optical path, this is a merely functional description. Actually, when signals are to be bridged by using an optical splitter as described above, even if a control signal is set on the device side, there will be no change in the real state of the optical signals. It is self-evident that the effect of this embodiment would be no different in this case either. As described so far, the optical transmission system of this embodiment allows no unexpected alarm to be issued even in the mixed presence of one-to-one type optical paths and one-to-N type optical paths.

Therefore, it is considered extremely effective in having an optical transmission system perform audiovisual content delivery or the like. The optical transmission system according to the present invention allows no unexpected alarm to be issued even in the mixed presence of one-to-one type optical paths and one-to-N type optical paths and facilitates easy management of paths.

What is claimed is:

1. An optical transmission system comprising a plurality of optical nodes capable of dropping or adding optical signals and a monitoring and controlling device that monitors and controls the plurality of optical nodes, wherein:

each of the optical nodes is provided with an optical transceiver and an optical add-drop unit that sends out to a transmission line or receives from the transmission line transmit or receive signals from the optical transceiver;

the optical add-drop unit:

regarding add signals, selects the optical signals of the optical transceiver of an own node thereof or optical signals from a second transmission line for optical signals to be sent out to a first transmission line, and regarding drop signals, drops signals from the first transmission line to the own node thereof, and sends out to the same to the second transmission line or blocks the same from being sent out to the second transmission line; and an alarm inhibiting device is further provided that, regarding transmit signals from a first optical transceiver of a first optical node, inhibits any unexpected alarm from being issued by the first optical transceiver when selection is made by the optical add-drop unit of a second optical node to drop the signals to the own node thereof and to send the signals out to a transmission line in a downlink direction.

2. The optical transmission system according to claim 1, wherein the alarm inhibiting device is related to notification for controlling purpose or maintaining alarm inhibition in setting path to the first optical transceiver by the monitoring and controlling device.

3. The optical transmission system according to claim 2, wherein when the first optical transceiver is selected as a transmitting terminal for a plurality of paths and transmit signals from the first optical transceiver are received by optical transceivers of a plurality of different optical nodes, path names which place the first optical transceiver and the plurality of optical transceivers in one-to-one correspondence are assigned to register and manage the plurality of paths being related to one another.

4. The optical transmission system according to claim 2, wherein in a state in which the first optical transceiver is selected as a transmitting terminal for a plurality of paths and paths are set for causing transmit signals from the first optical transceiver to be received by optical transceivers of a plurality of different optical nodes, a path having the transmitting terminal of the plurality of paths as one terminal and another optical transceiver different from the plurality of optical transceivers is added.

5. The optical transmission system according to claim 1, wherein the alarm inhibiting device is based on transmission only of transmit signals from the optical transceiver of the second optical node to the first optical transceiver of the first optical node.

6. The optical transmission system according to claim 5, wherein when the first optical transceiver is selected as a transmitting terminal for a plurality of paths and transmit signals from the first optical transceiver are received by optical transceivers of a plurality of different optical nodes, path names which place the first optical transceiver and the plurality of optical transceivers in one-to-one correspondence are assigned to register and manage the plurality of paths being related to one another.

7. The optical transmission system according to claim 5, wherein in a state in which the first optical transceiver is selected as a transmitting terminal for a plurality of paths and paths are set for causing transmit signals from the first optical transceiver to be received by optical transceivers of a plurality of different optical nodes, a path having the transmitting terminal of the plurality of paths as one terminal and another optical transceiver different from the plurality of optical transceivers is added.

8. The optical transmission system according to claim 1, wherein when the first optical transceiver is selected as a transmitting terminal for a plurality of paths and transmit signals from the first optical transceiver are received by optical transceivers of a plurality of different optical nodes, path names which place the first optical transceiver and the plurality of optical transceivers are assigned in one-to-one correspondence to register and manage the plurality of paths being related to one another.

9. The optical transmission system according to claim 1, wherein in a state in which the first optical transceiver is selected as a transmitting terminal for a plurality of paths and paths are set for causing transmit signals from the first optical transceiver to be received by optical transceivers of a plurality of different optical nodes, a path having the transmitting terminal of the plurality of paths as one terminal and another optical transceiver different from the plurality of optical transceivers is added.

10. An optical node comprising an optical transceiver and an optical add-drop unit that sends out to a transmission line or receives from the transmission line transmit or receive signals from the optical transceiver,
wherein when the optical add-drop unit, regarding drop signals, drops signals from a first transmission line to the optical node and sends out the signals from the first transmission line to a second transmission line, the optical add-drop unit, regarding add signals, selects optical signals of the optical transceiver of the optical node as optical signals to be sent out to the first transmission line and blocks receive signals from the second transmission line.

\* \* \* \* \*